United States Patent [19]

Russ et al.

[11] Patent Number: 4,539,187

[45] Date of Patent: Sep. 3, 1985

[54] METHOD FOR SEPARATING AND RECOVERING SILICA, ALUMINUM AND IRON FROM FLY ASH, MINERAL ORES AND MINE TAILINGS

[75] Inventors: James J. Russ, Lawrenceburg; John W. Smith, Germantown, both of Tenn.

[73] Assignee: Hydro Fuels, Inc., Wilmington, Del.

[21] Appl. No.: 544,437

[22] Filed: Oct. 21, 1983

[51] Int. Cl.$^3$ .......................... C01F 7/00; C01B 33/18
[52] U.S. Cl. .................................... 423/132; 423/133; 423/150; 423/336; 423/341; 423/343; 423/484
[58] Field of Search ............... 423/132, 150, 341, 336, 423/343

[56] References Cited

U.S. PATENT DOCUMENTS

| | | | |
|---|---|---|---|
| 1,036,453 | 8/1912 | Childs | 423/132 |
| 3,961,030 | 6/1976 | Wiewiorowski et al. | 423/132 |
| 4,069,296 | 1/1978 | Huang | 423/132 |

Primary Examiner—H. T. Carter
Attorney, Agent, or Firm—Kendrick, Netter & Bennett

[57] ABSTRACT

A method for separating and recovering substantially pure aluminum, iron and silica from fly ash, a by-product of coal combustion, includes reacting the fly ash with aqueous fluosilicic acid and aqueous hydrogen fluoride at temperatures sufficiently high to form aqueous silicon fluoride vapor and fluorides and fluosilicate of aluminum and iron, separating the aluminum and iron fluorides and fluorosilicates from the aqueous silicon fluoride vapor, hydrolizing the silicon fluoride vapor to form silicon dioxide in substantially pure form and hydrogen fluoride, recovering and recycling the hydrogen fluoride for reuse in the process, and separating the aluminum and iron fluorides and fluosilicates from one another, and recovering substantially pure aluminum fluoride, substantially pure iron and other substantially pure metals, by electroplating or otherwise.

12 Claims, 2 Drawing Figures

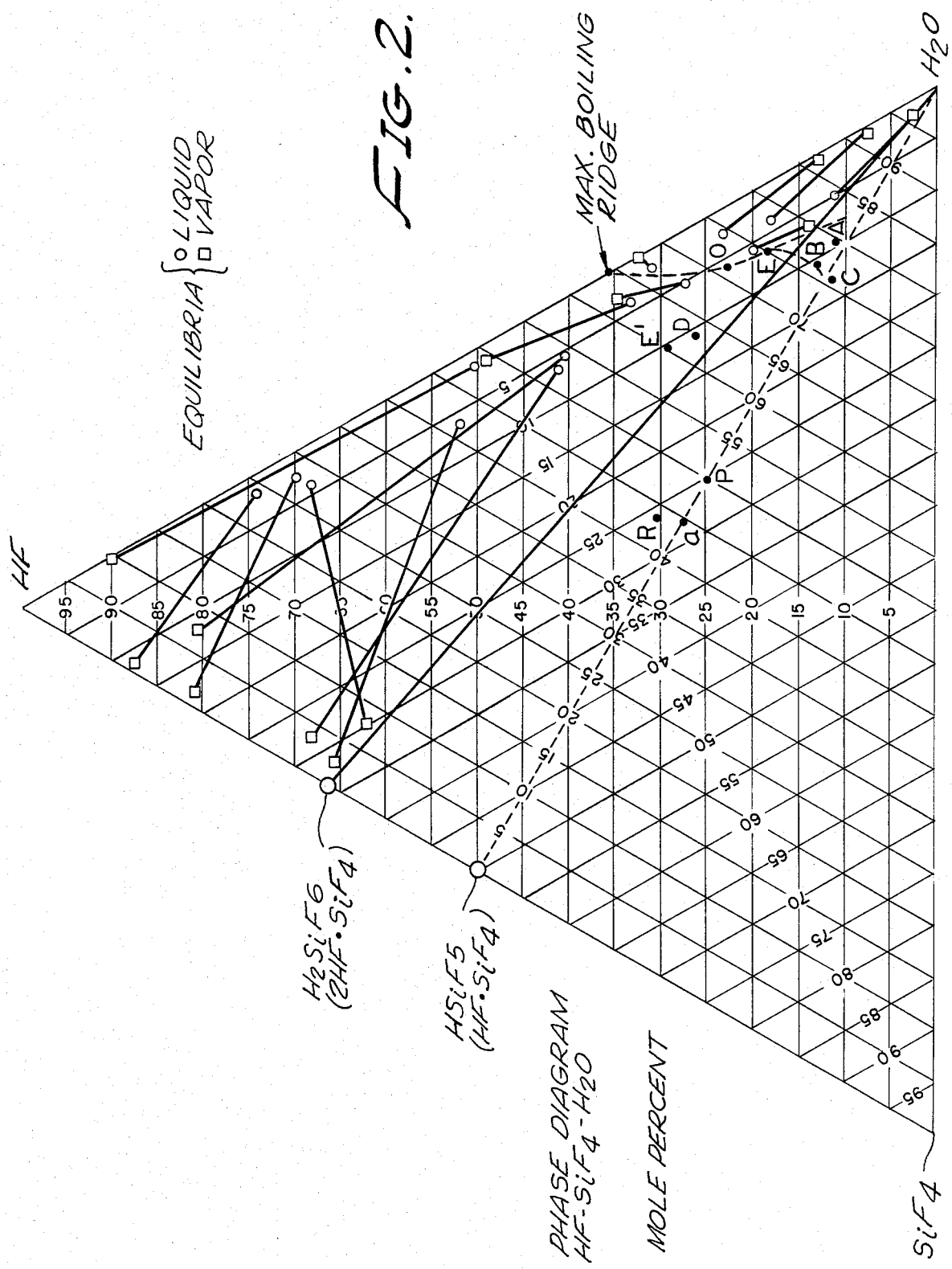

METHOD FOR SEPARATING AND RECOVERING SILICA, ALUMINUM AND IRON FROM FLY ASH, MINERAL ORES AND MINE TAILINGS

This invention relates to methods for extracting high purity silica, aluminum, iron, and other metals from fly ash, mine tailings, mineral ores and the like. The method comprises reacting fly ash, mine tailings, or mineral ores with aqueous hydrogen fluoride to form fluorides and fluosilicates of the aluminum, iron and other metals, and aqueous silicon fluoride and fluosilicic acid; then distilling the mixture of silicon fluoride and fluosilicic acid with the metal fluorides and fluosilicates at a temperature sufficiently high to form aqueous silicon fluoride vapor; separating the aqueous silicon fluoride vapor from the fluorides and fluosilicates of the metals, and cooling and hydrolyzing the silicon fluoride vapors to recover silicon dioxide and hydrogen fluoride; separating the metal fluorides and fluosilicates from one another; and recycling the recovered hydrogen fluorides for reuse in the process.

In preferred embodiments of our new methods, we first react the mine tailings, mineral ores or fly ash with sufficient hydrogen fluoride and fluosilicic acid to convert substantially all of the metals to fluorides and fluosilicates and substantially all of the silica to silicon fluoride and fluosilicic acid. For fly ashes containing, by weight, about 50% silica, about 20% ferrous oxide, about 17% aluminum oxide, about 7% calcium oxide, and the balance trace metals and inerts in the range of about 5%, for example, the molar ratio of hydrogen fluoride to the fly ash necessary for complete conversion of the silica to silicon fluoride and fluosilicic acid, and of the metals to metal fluorides and fluosilicates is in the range of about 20% to about 30%.

Distillation of the mixture of metal fluorides and fluosilicates with silicon fluoride and fluosilicic acid preferably takes place at a temperature in the range of about 90° C. to about 110° C. at ambient pressure, and continues for a time sufficient to distill off substantially all of the silicon fluoride and fluosilicic acid. Thereafter, upon cooling and hydrolyzing the aqueous silicon fluoride vapor, much of the heat of distillation is recovered, and can be used in the conversion step. As a result, the energy consumption of the process can be quite low.

An important advantage of our methods is that substantially all of the hydrogen fluoride that reacts with silicon is recovered and recycled for reuse in the process. Moreover, our new methods permit recovery of substantial quantities of silica, aluminum, iron and other metals in substantially pure form, and provide a highly practical use for fly ash, which has few commercial uses and represents a substantial solid waste disposal problem.

After separation of the metal fluorides and fluosilicates from the silicon fluoride, the metal fluorides and fluosilicates can be separated from one another by known methods. For example, centrifuging the mixture of metal fluorides and fluosilicates permits separation of solid fluorides such as calcium and magnesium fluoride from highly soluble fluosilicates such as magnesium and sodium fluosilicates. Calcium and magnesium fluorides can then be converted to oxides by hydrolysis, then recovered and separated from one another for commercial use. Aluminum, iron, sodium, potassium, manganese and magnesium fluosilicate salts can be separated from one another by selective precipitation, and recovered as such, or can be converted to fluorides with recovery of hydrofluoric and fluosilicic acids for reuse in our method.

In the preferred embodiments of our methods for recovery of substantially pure silica and metal values from fly ash, which includes silica bound to a variety of metals and metal oxides (here denoted "MO"), the sequence of reactions for recovery of silicon in substantially pure form and for recovery of hydrogen fluoride for reuse are as follows:

1.
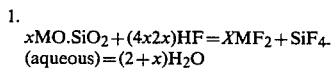
$x\text{MO.SiO}_2 + (4x2x)\text{HF} = X\text{MF}_2 + \text{SiF}_4$
(aqueous) $= (2+x)\text{H}_2\text{O}$ 1a.
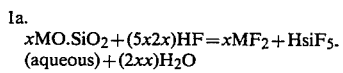
$x\text{MO.SiO}_2 + (5x2x)\text{HF} = x\text{MF}_2 + \text{HsiF}_5$
(aqueous) $+ (2xx)\text{H}_2\text{O}$ 2.
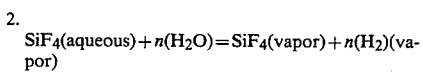
$\text{SiF}_4\text{(aqueous)} + n(\text{H}_2\text{O}) = \text{SiF}_4\text{(vapor)} + n(\text{H}_2)\text{(vapor)}$ 2a.
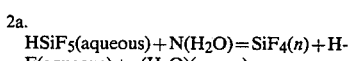
$\text{HSiF}_5\text{(aqueous)} + N(\text{H}_2\text{O}) = \text{SiF}_4(n) + \text{HF(aqueous)} + n(\text{H}_2\text{O})\text{(vapor)}$ 3. 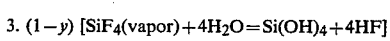 $(1-y) [\text{SiF}_4\text{(vapor)} + 4\text{H}_2\text{O} = \text{Si(OH)}_4 + 4\text{HF}]$ 3a. 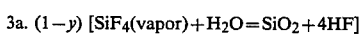 $(1-y) [\text{SiF}_4\text{(vapor)} + \text{H}_2\text{O} = \text{SiO}_2 + 4\text{HF}]$ 4. 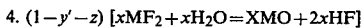 $(1-y'-z) [x\text{MF}_2 + x\text{H}_2\text{O} = X\text{MO} + 2x\text{HF}]$ 5. 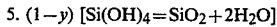 $(1-y) [\text{Si(OH)}_4 = \text{SiO}_2 + 2\text{H}_2\text{O}]$ Our invention can better be understood by reference to the accompanying drawing, in which:

FIG. 2 is a phase diagram showing the liquid/vapor equilibria for the several products of our process.

Figure 1:
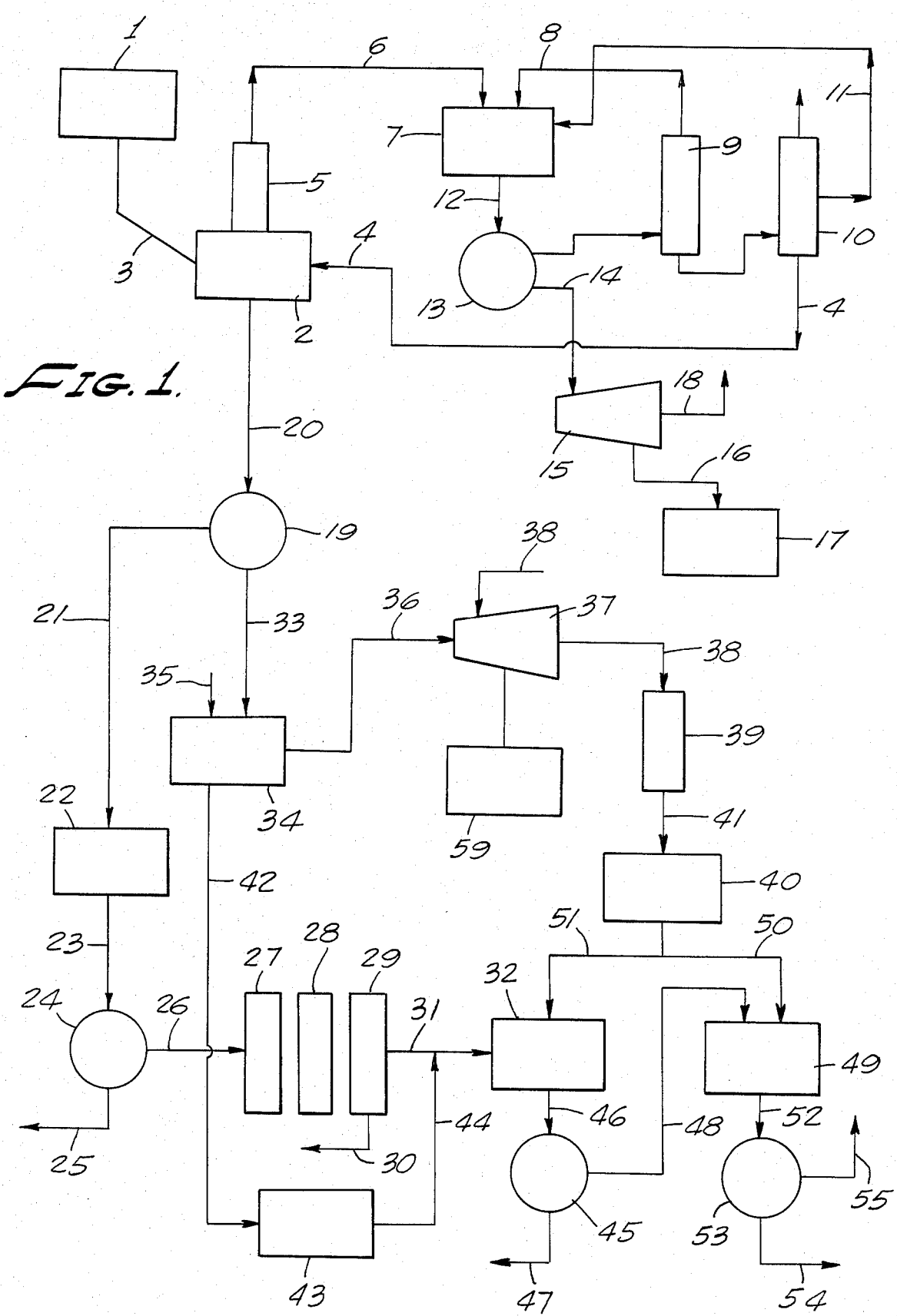
FIG. 1 is a schematic diagram of the preferred embodiment of our process.

Referring to FIG. 1, fly ash, ore or mineral tailings stored in hopper 1 is conveyed to acid leach tank 2 on path 3. Aqueous fluosilicic acid, rich in hydrogen fluoride, also passes to leach tank 2 on path 4. The aqueous fluosilicic acid and hydrogen fluoride react with the fly ash, ore or mineral tailings exothermically, with the temperature in leach tank 2 rising into the range of about 90° C. to about 120° C. The reaction continues for a time sufficient, say about 10 to about 20 minutes, to digest the mineral values and silicon values in the material to be processed. Vapors rich in silicon fluoride and steam exit leach tank 2 and pass into stripper 5. From stripper 5, these vapors pass, on path 6, to hydrolyzer 7. The silicon fluoride and steam, recovered in stripper 9, are passed to hydrolyzer 7 on path 8. Aqueous fluosilicic acid rich in silicon fluoride, recovered in fractional distillation 10, passes on path 11 to hydrolyzer 7 as well.

Silicic acid forms in hydrolyzer 7, and passes with the liquids from hydrolyzer 7 on path 12 to centrifuge 13. From centrifuge 13, solid silicic acid exits on path 14, and passes to drying kiln 15. Drying kiln 15, operating at about 300° C., produces solid, pure silicon dioxide on path 16 for storage in container 17, and steam on path 18 for recycle to hydrolyzer 7 on path 18.

The solids from leach tank 2 pass to centrifuge 19 on path 20. The mixture passing to centrifuge 19 includes solid, relatively undissolved metal fluorides such as calcium and magnesium fluoride, and highly soluble metal fluosilicate salts such as magnesium, sodium, potassium, aluminum, and manganese fluosilicates. The fluosilicates in solution pass from centrifuge 19 on path 21 to crystallizing tank 22. The mixture is held in crystallizing tank 22 for a time sufficient to permit solid metal fluosilicates to form, then passes on path 23 to centrifuge 24. From centrifuge 24, solid metal fluosilicate salts such as sodium and potassium fluosilicates emerge on path 25. Dissolved, liquified metal fluosilicate salts such as magnesium and aluminum fluosilicates exit centrifuge 24 on path 26 and pass to ion exchange towers 27, 28 and 29. Some of the metal fluosilicate salts precipitate in these towers, and then are recovered on path 30. Others remain in solution, emerge from tower 29 in solution on path 31, and pass to precipitator 32.

The solids from centrifuge 19 pass on path 33 to dissolving tank 34. Silicon fluoride and water are added to dissolving tank 34 via path 35. Liquids containing dissolved metals from fluoride salts such as calcium and magnesium fluoride emerge from dissolving tank 34 on path 36 and pass to hydrolyzing kiln 37. Steam enters kiln 37 on path 38. Solid metal salts such as calcium and magnesium oxide emerge from kiln 37 on path 38 and pass to storage 39. Aqueous hydrogen fluoride and steam emerge from kiln 37 on path 38 and pass to condenser 39 and then to storage tank 40 on path 41.

Water containing dissolved fluoride salts passes from dissolving tank 34 on path 42 to electrolytic cell 43, where platable metals such as iron can be recovered. Metals that are not platable or recoverable through electrolysis emerge from cell 43 on path 43 and pass on path 31 to precipitator 32. The liquids from precipitator 32 pass to centrifuge 45 on path 46, and solids such as magnesium and calcium fluoride are recovered from centrifuge 45 on path 47. Undissolved metal fluorides pass from centrifuge 45 on path 48 to precipitator 49. Aqueous hydrogen fluoride enters precipitator 49 on path 50. The precipitated metals emerge from precipitator 49 on path 52 and pass to centrifuge 53. From centrifuge 53, solid metal fluorides such as aluminum fluoride emerge on path 54, and aqueous hydrogen fluoride is recovered on path 55 for recycle to leach tank 2.

Among the fluosilicates that can be recovered in this process are: $Al_2(SiF_6)_3$, $BaSiF_6$, $CdSiF_6.2H_2O$, $CaSiF_6$, $CaSiF_6$, $CoSiF_6.6H_2O$, $CuSiF_6$, $FeSiF_6.6H_2O$, $PbSiF_6.2H_2O$, $LiSiF_6.2H_2O$, $MgSiF_6.2H_2O$, $NiSiF_6.6H_2O$, $MnSiF_6.6H_2O$, $Rb_2SiF_6$, $Ag_2SiF_6.4H_2O$, $Na_2SiF_6$, $SrSiF_6.2H_2O$, $Tl_2SiF_6.2H_2O$, $ZnSiF_6.6H_2O$.

Among the fluoride compounds that can be recovered by our process are the following: $AlF_3$, $AsF_3$, $BaF_2$, $BeF_2$, $BiF$, $BF_3$, $CdF_2$, $CaF_2$, $CeF_3$, $CsF$, $CrF_2$, $CoF_2.2H_2O$, $CuF$, $CaF_3$, $GeF_2$, $InF_3.2H_2O$, $TrF_6$, $FeF_2$, $PbF_2$, $LiF_2$, $MgF_2$, $MnF_2$, $MoF_6$, $NiF_2$, $NbF_5$, $OsF_6$, $PdF_2$, $PtF_2$, $ReF_4$, $RhF_3$, $RbF$, $RuF_5$, $SiF_4$, $A_9F$, $NaF$, $SrF_2$, $TaF_5$, $TlF_3$, $ThF_4$, $S_7F_4$, $TiF_3$, $WF_6$, $UF_4$, $VF_3$, $ZnF_2$, $ZrF_4$.

Still other metals, such as gold, antimony, hafnium, lanthanum and some rare earths, remain undissolved in our process, and emerge from ion exchange towers 27, 28 and 29 as solids. These metals can be recovered from the resins in the towers by washing these resins, and then separating the metals from one another.

FIG. 2 is a phase diagram showing the reactions set forth in Tables I, II and III.

EXAMPLE

We prepared a leach solution of constant boiling point having a molar composition of 23 mole percent hydrogen fluoride, 6 mole percent silicon fluoride and 71 mole percent water. To this solution we added three moles of silica and distilled to remove 12 moles of water. We then added another three moles of silica, and an additional 12 moles of hydrogen fluoride. We removed insoluble residues by filtration, and added another 19 moles of anhydrous hydrogen fluoride. We then distilled to drive off six moles of silicon fluoride and 12 moles of hydrogen fluoride. We separated the hydrogen fluoride from the silicon fluoride, hydrolyzed the silicon fluoride, and captured the hydrogen fluoride for recycle.

The material balance for this example appears on page 8 in Table I below. As Table I shows, the composition obtained in Step F is the same composition required at step O. In this process, 36 moles of hydrogen fluoride are added, and 12 are recovered. To form the fluorides of all other metals, 14.2 moles of hydrogen fluoride are required. The six moles of silicon fluoride generated in steps D and E are combined with the 12 moles of water from steps A and B in the hydrolysis step of our process.

As Table II on page 9 shows, our process can conveniently be carried out in a solution of 520 moles of silica-saturated acid having a molar composition of 25 mole percent hydrogen fluoride, 25 mole percent silicon fluoride, and 50 mole percent water. Here, the composition obtained from step F is the same as the composition required for the initial step P.

TABLE I

| | | | | Material Balance for 100 Moles HF-Acid Leach | | | | | | |
|---|---|---|---|---|---|---|---|---|---|---|
| | Gram Moles | | | | | Grams | | | Mole % | |
| Steps | HF | $H_2O$ | $SiF_4$ | Stage | HF | $H_2O$ | $SiF_4$ | HF | $H_2O$ | $SiF_4$ |
| 0 | 23 | 71 | 6 | Initial | 460 | 1268 | 624 | — | — | — |
| A | 11 | 77 | 9 | Add ½ ash | — | — | — | 11.3 | 79.4 | 9.3 |
| B | 11 | 65 | 9 | Distill 12 mole % $H_2O$ | — | — | — | 13.0 | 76.4 | 10.6 |
| C | 11 | 71 | 12 | Add ½ ash + 12 mole % | — | — | — | 11.7 | 75.5 | 12.8 |
| D | 30 | 71 | 12 | Add 19 mole % HF | — | — | — | 26.5 | 63.0 | 10.6 |
| E | 18 | 71 | 6 | Distill 6 mole % $SiF_4$ | — | — | — | 18.9 | 74.8 | 6.3 |
| F | 23 | 71 | 6 | Add 5 mole % HF | — | — | — | — | — | — |

TABLE II

| | | | | Material Balance for 100 Moles HF-Acid Leach | | | | | | |
|---|---|---|---|---|---|---|---|---|---|---|
| | Gram Moles | | | | | Grams | | | Mole % | |
| Steps | HF | $H_2O$ | $SiF_4$ | Stage | HF | $H_2O$ | $SiF_4$ | HF | $H_2O$ | $SiF_4$ |
| P | 125 | 250 | 125 | Initial | 2500 | 4500 | 13,000 | 25 | 50 | 25 |
| Q | 149 | 238 | 149 | Add 30 mole % $SiF_4$; | — | — | — | 27.8 | 44.4 | 27.8 |

TABLE II-continued

| | Material Balance for 100 Moles HF-Acid Leach | | | | | | | | | |
|---|---|---|---|---|---|---|---|---|---|---|
| | Gram Moles | | | | Grams | | | Mole % | | |
| Steps | HF | H$_2$O | SiF$_4$ | Stage | HF | H$_2$O | SiF$_4$ | HF | H$_2$O | SiF$_4$ |
| R | 173 | 250 | 149 | remove SiO$_2$ Add 24 mole % HF, 12 mole % H$_2$O, distill 24 mole % SiF$_4$, and 48 mole % HF | — | — | — | 30.2 | 43.7 | 26.1 |
| S | 125 | 250 | 125 | Final | | | | | | |

In the distillation steps R-S of Table II and D-E of Table I, the ratio of silicon fluoride to hydrogen fluoride is maintained at 1:2, the desirable minimum. A higher ratio is desirable for improving process efficiency, but the ratio cannot exceed about 2, or recovery of hydrolytically-formed hydrogen fluoride in steps R-S will be precluded.

As Table III below shows, the heat balance of our method is favorable. The heat-absorbing steps in the sequences set forth in Tables I and II are A-B, D-E and R-S, the distillation steps. In commercial practice, the heat required for the distillation steps can be derived from the heat generated in steps O-A, B-C, C-D, E-F, P-Q and Q-R.

TABLE III

| | Process Heat Balance | | |
|---|---|---|---|
| Step | ΔH | Temperature (Centigrade) | Equation |
| O-A | −90 Kcal | 100 | SiO$_2$ + 5HF = HF.SiF$_4$ + 2H$_2$O |
| A-B | 120 | 110 | H$_2$O(liq.) = H$_2$O(vapor) |
| B-C | −52.5 | 100 | Same as O-A |
| | −144 | 100 | HF(anh liq.) = HF(aqueous) |
| C-D | −228 | 100 | HF(anh liq.) = HF(aqueous) |
| D-E | 353 | 90–110 | H$_2$SiF$_6$(aqueous = 2H(vapor) + SiF$_4$(vapor) |
| E-F | −60 | 100 | HF(anh liq.) = HF(aqueous) |
| P-Q | −517.8 | 60–90 | 5SiF$_4$ + 2H$_2$O = 4HF.SiF$_4$ + SiO$_2$ |
| Q-R | −228 | 90 | HF(anh liq.) = HF(aqueous) |
| R-S | 1412 | 60–100 | H$_2$SiF$_6$(aqueous).2HF(vapor) + SiF$_4$(vapor) |

What is claimed is:

1. A method comprising reacting fly ash that includes aluminum, iron and silica with sufficient fluosilicic acid and hydrogen fluoride to form fluorides and silico fluorides of iron, aluminum and silicon distilling said mixture to form vaporous, aqueous silicon fluoride, and separating said aqueous, vaporous silicon fluoride from the fluorides and fluosilicates of iron and aluminum; hydrolyzing the silicon fluorides to form highly pure silicon dioxide and hydrogen fluoride, and recovering silicon dioxide substantially free of aluminum, iron and other impurities; recovering and recycling the hydrogen fluoride for reuse in said method; and separating the fluorides and fluosilicates of aluminum and iron from one another.

2. The method of claim 1 wherein said distilling takes place at a temperature in the range of about 90° C. to about 110° C.

3. A method comprising reacting mineral ores that include aluminum, iron and silica with sufficient fluosilicic acid and hydrogen fluoride to form fluorides and silico fluorides of iron, aluminum and silicon; distilling said mixture to form vaporous, aqueous silicon fluoride, and separating said aqueous, vaporous silicon fluoride from the fluorides and fluosilicates of iron and aluminum, hydrolyzing the silicon fluorides to form highly pure silicon dioxide and hydrogen fluoride, and recovering silicon dioxide substantially free of aluminum, iron and other impurities; recovering and recycling the hydrogen fluoride for reuse in said method; and separating the fluorides and fluosilicates of aluminum and iron from one another.

4. The method of claim 3 wherein said distilling takes place at a temperature in the range of about 90° C. to about 110° C.

5. A method comprising reacting mine tailings that includes aluminum, iron and silica with sufficient fluosilicic acid and hydrogen fluoride to form fluorides and silico fluorides of iron, aluminum and silicon distilling said mixture to form vaporous, aqueous silicon fluoride, and separating said aqueous, vaporous silicon fluoride from the fluorides and fluosilicates of iron and aluminum; hydrolyzing the silicon fluorides to form highly pure silicon dioxide and hydrogen fluoride, and recovering silicon dioxide substantially free of aluminum, iron and other impurities; recovering and recycling the hydrogen fluoride for reuse in said method; and separating the fluorides and fluosilicates of aluminum and iron from one another.

6. The method of claim 5 wherein said distilling takes place at a temperature in the range of about 90° C. to about 110° C.

7. A method comprising reacting solids selected from the group consisting of fly ash, mineral ores and mine tailings, said solids comprising aluminum, iron and silicon with sufficient fluosilicic acid and hydrogen fluoride to form fluorides and silico fluorides of iron, aluminum and silicon; distilling said mixture to form vaporous, aqueous silicon fluoride, and separating said aqueous, vaporous silicon fluoride from the fluorides and fluosilicates of iron and aluminum; and hydrolyzing the silicon fluorides to form highly pure silicon dioxide and hydrogen fluorides; recovering highly pure silicon dioxide substantially free of aluminum, iron and other impurities; and recovering and recycling the hydrogen fluoride to reuse in said method.

8. The method of claim 7 wherein said distilling takes place at a temperature in the range of about 90° C. to about 110° C.

9. The method of claim 7 wherein said solids are mineral ores.

10. The method of claim 7 wherein said solids are mine tailings.

11. The method of claim 7 wherein said solids are fly ash.

12. A method comprising reacting solids selected from the group consisting of fly ash, mineral ores and mine tailings, said solids comprising aluminum, iron and silicon with sufficient fluosilicic acid and hydrogen fluoride to form fluoride and silico fluorides of iron, aluminum and silicon; distilling said mixture to form vaporous, aqueous silicon fluoride, and separating said aqueous, vaporous silicon fluoride from the fluorides and fluosilicates of iron and aluminum; hydrolyzing the silicon fluorides to form highly pure silicon dioxide and hydrogen fluoride, and recovering highly pure silicon dioxide substantially free of aluminum, iron and other impurities.

* * * * *